US008882172B2

(12) United States Patent
Reeder

(10) Patent No.: US 8,882,172 B2
(45) Date of Patent: Nov. 11, 2014

(54) TENSIONING BOW ASSEMBLY FOR A FLEXIBLE COVER SYSTEM

(71) Applicant: Aero Industries, Inc., Indianapolis, IN (US)

(72) Inventor: Ryan Reeder, Carmel, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 14/091,402

(22) Filed: Nov. 27, 2013

(65) Prior Publication Data

US 2014/0145466 A1    May 29, 2014

Related U.S. Application Data

(60) Provisional application No. 61/730,873, filed on Nov. 28, 2012.

(51) Int. Cl.
 *B60P 7/02* (2006.01)
 *B60J 7/08* (2006.01)

(52) U.S. Cl.
 CPC .................................... *B60J 7/085* (2013.01)
 USPC ................................................... 296/100.14

(58) Field of Classification Search
 CPC ......... A47D 7/04; A47D 7/02; A47D 13/063; A01M 23/04; A01M 23/06; A01K 89/0108; B60J 7/085; B42C 7/00; D06F 37/02; D06F 37/04

USPC ...................... 296/100.14, 100.15, 98; 43/61; 242/230, 231, 232; 160/23.1, 67
See application file for complete search history.

(56) References Cited

U.S. PATENT DOCUMENTS

| | | | | |
|---|---|---|---|---|
| 3,977,719 | A * | 8/1976 | Thurston | 296/98 |
| 4,157,202 | A * | 6/1979 | Bachand | 296/100.11 |
| 4,893,864 | A * | 1/1990 | Bailey | 296/98 |
| 5,031,955 | A * | 7/1991 | Searfoss | 296/98 |
| 5,125,713 | A * | 6/1992 | Willingham et al. | 296/98 |
| 5,482,347 | A * | 1/1996 | Clarys et al. | 296/98 |
| 5,887,937 | A * | 3/1999 | Searfoss | 296/122 |
| 5,957,523 | A * | 9/1999 | Haddad, Jr. | 296/98 |
| 6,474,719 | B2 * | 11/2002 | Henning | 296/98 |
| 6,575,518 | B1 * | 6/2003 | Henning | 296/98 |
| 6,637,800 | B2 * | 10/2003 | Henning | 296/100.15 |
| 6,712,419 | B1 | 3/2004 | Gothier | |

(Continued)

*Primary Examiner* — Kiran B Patel
(74) *Attorney, Agent, or Firm* — Maginot, Moore & Beck LLP

(57) ABSTRACT

A cover system for covering an open top of a container includes a flexible cover, a bail member, a bow member, and a tension element. The cover has a first end connected to the container and is sized to cover the open top when a second end is in an extended position. The bail member has an end pivotally connected to the container and an end connected to the second end of the cover. The bail member pivots to deploy the cover into the extended position. The bow member includes an end pivotally connected to the bail member and an end configured to bear against the cover between the ends of the cover. The tension element is connected between the container and the bow member. The tension element applies a force to the bow member to apply a force against the cover.

14 Claims, 5 Drawing Sheets

(56) References Cited

U.S. PATENT DOCUMENTS

| | | | |
|---|---|---|---|
| 6,893,071 B2 * | 5/2005 | Chabot | 296/98 |
| 7,275,780 B2 * | 10/2007 | Boyd et al. | 296/100.14 |
| 7,552,961 B2 * | 6/2009 | Eglinton | 296/98 |
| 8,205,927 B2 * | 6/2012 | Eggers | 296/98 |
| 8,220,859 B2 | 7/2012 | Reeder et al. | |
| 8,267,461 B2 | 9/2012 | Prince et al. | |
| 8,444,206 B2 * | 5/2013 | Prince | 296/98 |
| 2011/0254310 A1 * | 10/2011 | Royer | 296/100.14 |

* cited by examiner

TENSIONING BOW ASSEMBLY FOR A FLEXIBLE COVER SYSTEM

This application is a utility application claiming priority to U.S. provisional patent application Ser. No. 61/730,873, filed on Nov. 28, 2012, entitled "Tensioning Bow Assembly for a Flexible Cover System," the disclosure of which is incorporated herein by reference in its entirety.

BACKGROUND

The present disclosure relates to flexible covers or tarping systems for open-topped containers and particularly concerns a mechanism for restraining the flexible cover or tarp against the container.

Many hauling vehicles, such as dump trucks, include open-topped containers used for hauling or storing various materials. In a typical dump truck application, the open-topped container is referred to as the "dump body" of the truck. The dump body is used to haul a variety of load material, such as gravel and the like, as well as organic materials, such as grain or produce. Upon reaching the dumping site, the dump truck tilts the dump body to evacuate the load material from the dump body.

Depending upon the nature of the load material stored in the open-topped container, it is often desirable to provide a cover for the container. A cover is particularly valuable for covering the dump body of a dump truck when dump truck is in transit. Rigid covers are well known that may be hinged from one end of the container body and pivoted from an open to a closed position. While rigid covers may be acceptable for stationary containers, the same is usually not true for containers associated with land-traversing vehicles. Accordingly, rigid covers have given way to flexible cover systems.

Flexible cover systems utilize a flexible tarpaulin that can be drawn from a stowed position at one end of the container, to a deployed position covering the open top of the container. The flexible tarpaulin is preferable for dump trucks, because it can be easily stowed when the cover is not needed, such as during times when the dump body is being loaded and emptied. In addition, flexible cover systems are generally easier to deploy than rigid covers.

A variety of flexible cover systems have been developed that are geared toward particular hauling vehicle applications. One such tarping system is the Easy Cover® Tarping System manufactured and sold by Aero Industries, Inc. An example of one form of the Easy Cover® Tarping System is shown in FIG. 1. The system includes a U-shaped bail member 22 that is connected at a pivot mount 25 to the base of the container body 13 on the vehicle 10. A horizontal section 27 of the bail member 22 is attached to the tarp 16. The system also includes a U-shaped tensioning bow member 30 that is connected at a pivot mount 32 to the bail member 22. The tarp 16 is positioned between a horizontal section 34 of the tensioning bow member 30 and the container body 13. The tarp 16 can be preferably stowed by winding onto a tarp roller 19 at the forward end of the vehicle, which causes the tarp to slide under the horizontal section 34 of the tensioning bow member 30 as the bail member 22 pivots toward the front of the container body 13.

The system includes a variety of configurations that permit manual or powered deployment of the tarp over the open top of the container. In one typical installation, the pivot mount 25 includes a torsion spring pack that is biased to rotate the bail member 22 in a clockwise direction, as shown in FIG. 1, to pull the tarp 16 over the top of the container 13. The tarp roller 19 is biased to resist this rotation of the bail member 22. In some versions, a manual crank rotates the tarp roller 19 to allow the tarp 16 to unfurl under the torsion force of the spring pack. In other versions, a motor controls the rotation of the tarp roller. The manual crank or motor are rotated in the opposite direction to pull the bail member 22 toward the front of the container body 13 and to thereby stow the tarp 16.

One problem that is faced with tarping systems of the type shown in FIG. 1 is the effect of airflow or wind on the tarping system as the vehicle is traveling. In particular, the tarpaulin 16 is affected in a number of ways by the airflow associated with the traveling vehicle. This problem becomes especially acute at high speeds. In particular, the front end of the vehicle creates turbulent airflow that travels along the length of the container body 13. The turbulence, which can be manifested by air vortices along the top of the container body 13, has a tendency to lift the flexible cover 16 away from the top of the body.

Another problem facing the above-described tarping system is road vibration and shock, which can cause the bail member 22 and the tensioning bow member 30 to bounce on the container body 13 when the tarp 16 is deployed. This problem is especially noticeable for systems including the tensioning bow member 30, the position of which is maintained by only the weight of the tensioning bow member 30.

Movement of the tarp 16, the bail member 22, and the tensioning bow member 30 due to wind and vibration may have a deleterious effect is on the flexible cover system. The constant flapping and bouncing can gradually wear the tarp and the cover system components, which decreases the longevity of the cover system. In addition, when the tarp 16 is dislodged from its deployed position, the contents of the container body 13 are at risk of expulsion.

In order to address this problem, various systems have been devised to bias the tarp against the container body. In one common cover system, a web of cords is deployed over the tarp 16 along the length of the container body 13. The ends of the cords can be attached to mounts affixed to the side of the body 13. Whereas other cover systems rely on a complicated array of mechanical, electrical, and/or hydraulic structures to apply a constant tension along the length of the tarp 16. In most cases, however, these cover systems do not adequately restrain the bail/bow members 22, 30 or the tarp 16.

Another system is disclosed in U.S. Pat. No. 8,267,461 that contemplates a tarping system 100 for an open-topped container 120 includes a bail member, shown as a U-shaped tensioning bow member 102, and another U-shaped bail member 104, as shown in FIG. 2. The bail member 104 includes two legs 105 with end portions of the legs 105 connected to the bottom of the container 120 by a pair of torsion spring packs 134 (only one of which is illustrated in FIG. 2). The tensioning bow member 102 includes a pair of legs 103 and a horizontal mid-section 112. As described in the '461 Patent, the disclosure of which is incorporated herein by reference, the end portion of each leg 103 is connected to the legs 105 of the bail member 104 by another pair of torsion spring packs 108 (only one of which is illustrated in FIG. 2). The spring packs 108 include a housing 109 for one or more biasing springs (not shown) that is engaged to a mount 132 for fixing the spring packs to the bail member. The spring packs 108 form a hold-down assembly that is configured to bias the horizontal section 112 of the tensioning bow member 102 against the tarp 124 and an upper edge 128 of the container 120 (or a load carried by the container, if the load is positioned above the upper edge 128) to restrain movement the tensioning bow member 102. Accordingly, the horizontal section 112 is positioned against the tarp 124 by a force greater than just the weight of the bail member 102. The spring packs 108 exert a biasing force that is greater than the force exerted upon the tensioning bow member 102 by normal wind and/or gravity, among other effects.

Most prior approaches to maintaining the tarp against the container body either require manual intervention or sophisticated powered components. Accordingly, there remains a need for an improved tarping system having a tensioning bow member which is less prone to the wind and vibrations associated with a moving container.

SUMMARY

In one aspect, a cover system is provided for covering an open top of an open-topped container with a flexible cover, the flexible cover having one end connected to the container, and the flexible cover sized to substantially cover the open top when an opposite end of the flexible cover is moved to an extended position. The cover system comprises a bail member having a first end pivotally connected to the container and an opposite second end connected to the opposite end of the flexible cover. The bail member is configured for movement from a stowed position to a deployed position in which the flexible cover is in the extended position. The cover system further includes a tensioning bow member including an end portion pivotally connected to the bail member and horizontal bar at an opposite end configured for bearing against the flexible cover between the ends thereof.

In one feature, the system includes a mechanism for holding the tension bow member in engagement or contact with the flexible cover with sufficient force to prevent the cover and tension bow member from bouncing or flapping under wind and vibration conditions. The mechanism includes an elastic cable, such as a bungee-type cord, fastened between the horizontal bar of the tension bow member and a mount at the base of the open-topped container. The elastic cable moves freely with the tension bow member as the cover is unfurled or deployed.

DESCRIPTION OF THE PREFERRED EMBODIMENTS

Figure 1:
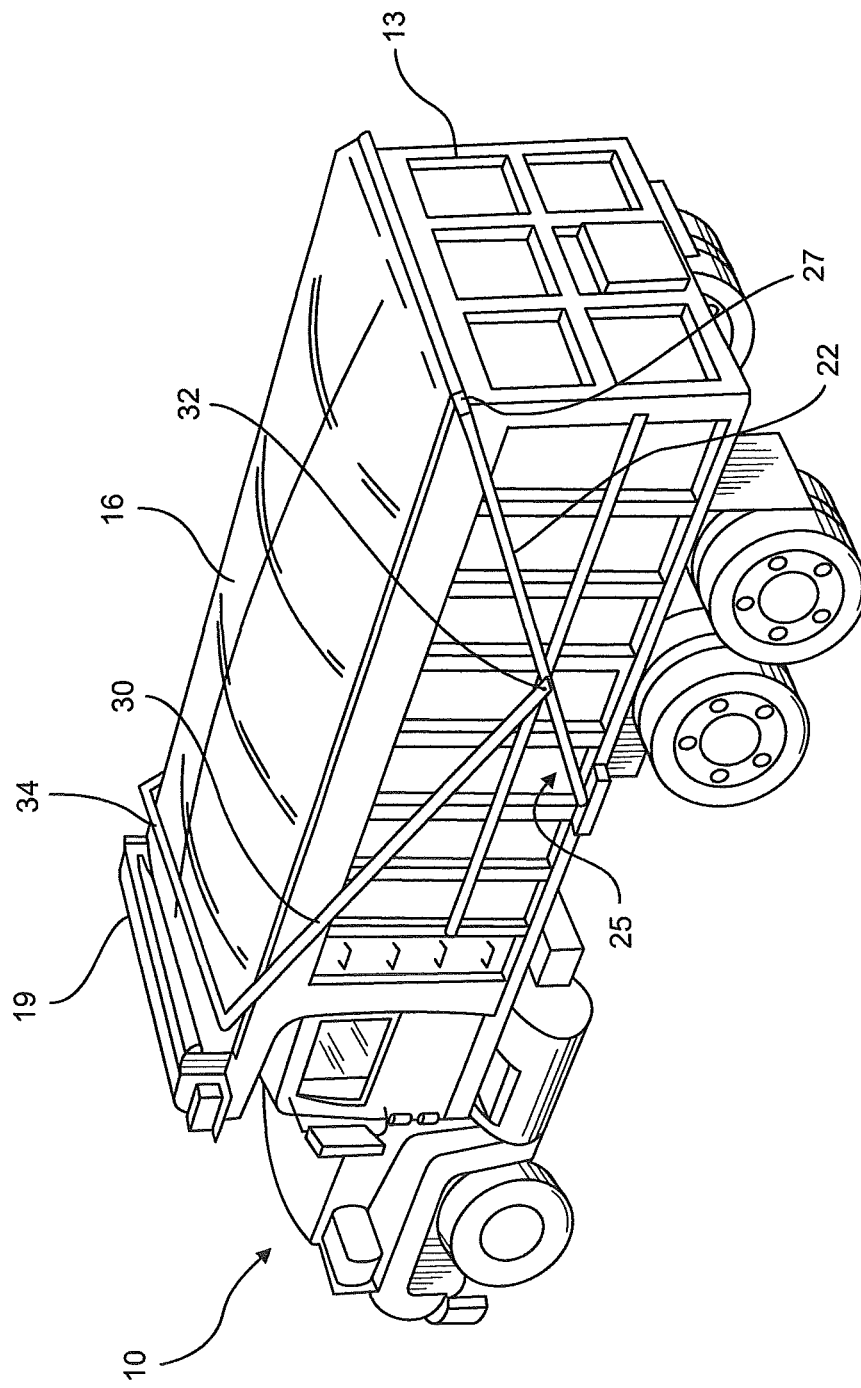
FIG. 1 is a top perspective view of a hauling vehicle utilizing a flexible cover system.

For the purpose of promoting an understanding of the principles of the disclosure, reference will now be made to the embodiments illustrated in the drawings and specific language will be used to describe the same. It should nevertheless be understood that no limitation of the scope of the disclosure is thereby intended. The disclosure includes any alterations and further modifications in the illustrated devices and described methods and further applications of the principles of the disclosure that would normally occur to one skilled in the art to which the disclosure relates. In the drawings, like reference numerals have been used throughout to designate like elements.

Figure 3:
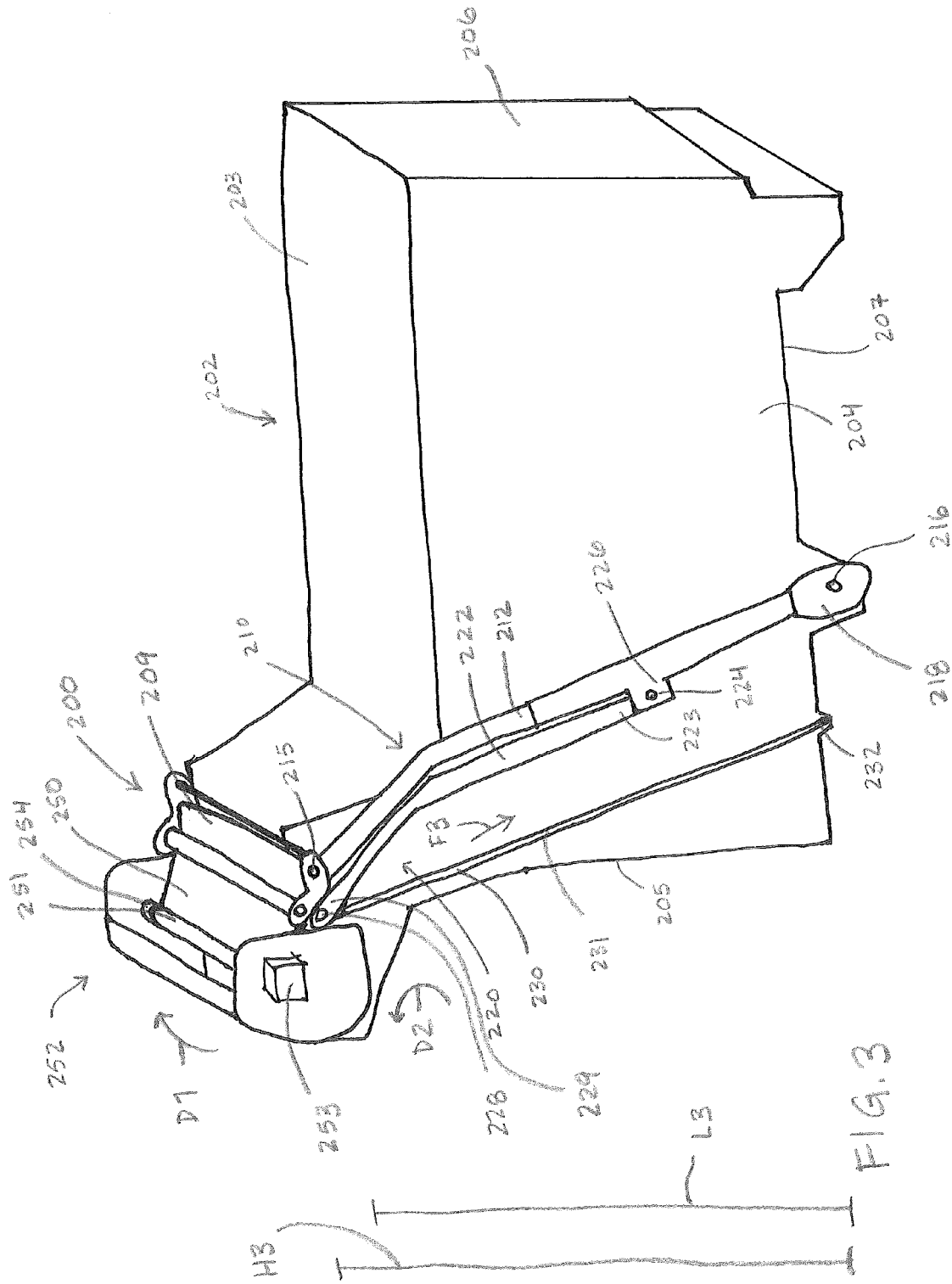
FIG. 3 is a side perspective view of a deployment assembly for a flexible cover system incorporating a tension bow mechanism according to a disclosed embodiment, shown with the cover system in an undeployed or open configuration.
Figure 4:
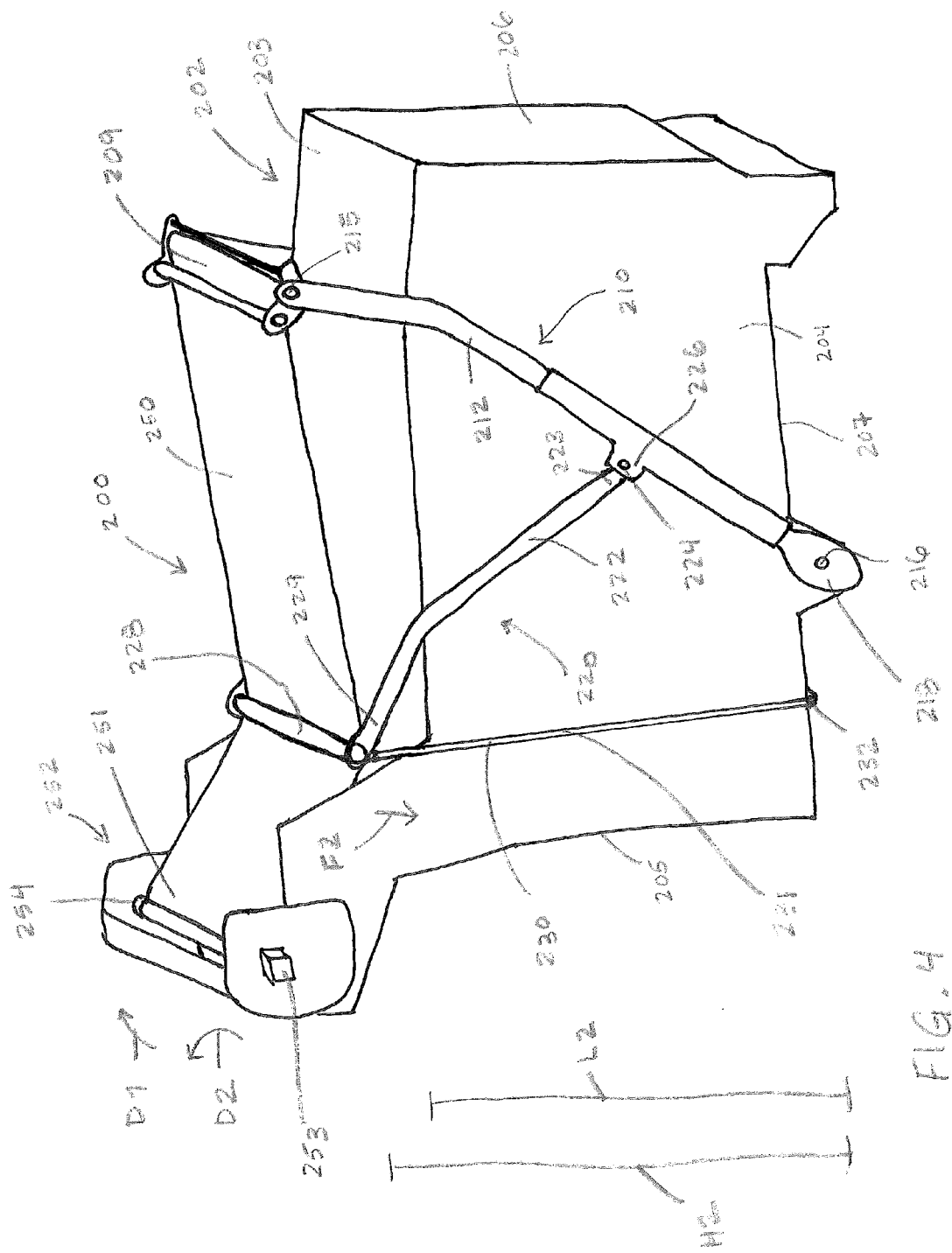
FIG. 4 is a side perspective view of the deployment assembly illustrated in FIG. 3, shown with the cover system in partially deployed configuration
Figure 5:
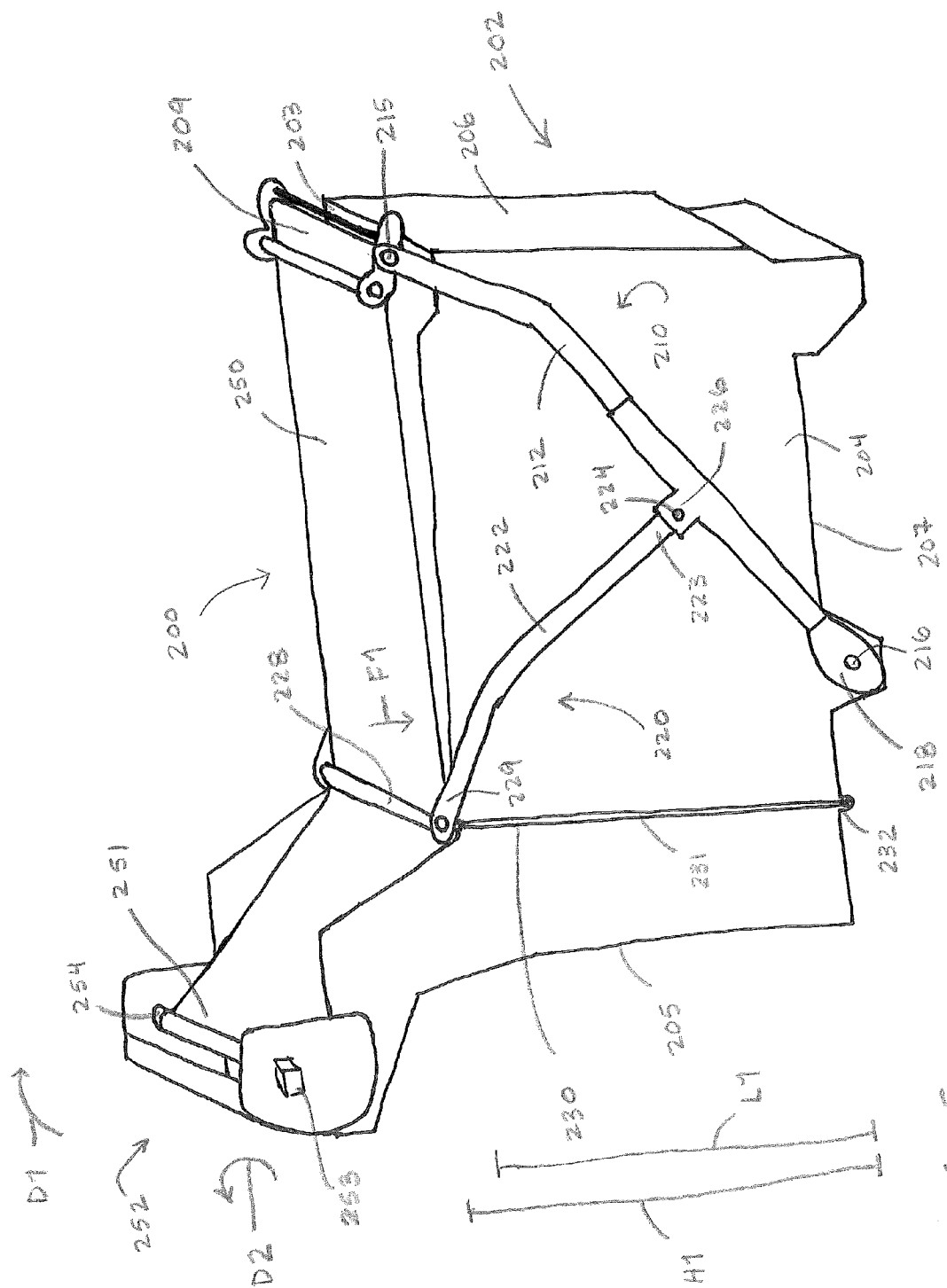
FIG. 5 is a side perspective view of the deployment assembly illustrated in FIGS. 3-4, shown with the cover system in a deployed or closed configuration

Referring to FIGS. 3-5, a flexible cover system 200 to be used in conjunction with a container 202 according to one embodiment is shown. The container 202 has an open top, a first side wall 203, a second side wall 204 opposite the first side wall 203, a proximal wall 205 positioned nearest the truck (shown in FIG. 1), a distal wall 206 opposite the proximal wall 205, and a bottom wall 207. Together, the walls 203, 204, 205, 206, and 207 define an interior volume that is utilized to hold a load. The cover system 200 is coupled to the container 202 and includes a flexible cover or tarpaulin 250, a roller assembly 252, a tension bow assembly 220, and a bail arm assembly 210. The cover 250 is wound onto the roller assembly 252 in a conventional manner and is deployed by the bail arm assembly 210 to cover the open top of container 202 in its deployed configuration (shown in FIG. 5).

The cover 250 includes a roller end 251 coupled to the roller assembly 252 and includes a bail arm end 209 coupled to the bail arm assembly 210. The cover 250 is shaped and sized such that when the cover 250 is in the deployed configuration (shown in FIG. 5), the roller end 251 is positioned adjacent to the proximal wall 205 of the container and the bail arm end 209 is positioned adjacent to the distal wall 206 so that the cover 250 extends over the open top of the container 202. When the cover 250 is in the open configuration (shown in FIG. 3), the cover 250 is wound onto the roller assembly 252 such that both the roller end 251 and the bail arm end 209 are positioned adjacent to the proximal wall 205 so that the cover 250 does not extend over the open top of the container 202.

The roller assembly 252 includes a retraction mechanism 253, such as is known in the art, and includes a roller 254 configured to be rotated by the retraction mechanism 253. The roller end 251 of the cover 250 is coupled to the roller 254 such that when the retraction mechanism 253 rotates the roller 254 in a first direction D1, the cover 250 is wound onto the roller 254 and when the retraction mechanism 253 rotates the roller 254 in a second opposite direction D2, the cover 250 is unwound from the roller 254.

The bail arm assembly 210 includes a pair of vertical legs 212 and a horizontal bar 215 coupled to both vertical legs 212. The horizontal bar 215 is also coupled to the bail arm end 209 of the cover 250. Each of the vertical legs 212 is rotatably mounted to the container 202 at a pivot point 216 positioned on the outsides of the side walls 203, 204 of the container 202. The bail arm assembly 210 also includes an actuation mechanism 218 coupled to one of the vertical legs 212 at the pivot point 216. The actuation mechanism 218 is configured to exert a torque on the vertical leg 212 at the pivot point 216 to rotate the bail arm assembly 210 away from the roller assembly 252. By way of example, the actuation mechanism 218 can be a torsion spring positioned at the pivot point 216. The actuation mechanism 218 moves the horizontal bar 215 away from the roller assembly 252 and toward the distal wall 206 of the container 202, thereby pulling the bail arm end 209 of the cover 250 toward the deployed position (shown in FIG. 5). In the embodiment shown, the bail arm assembly 210 includes only one actuation mechanism 218 which moves both vertical legs 212 and the horizontal bar 215 by exerting a torque on one vertical leg 212. In at least one alternative embodiment, however, the bail arm assembly 210 can include two actuation mechanisms 218, one for each of the vertical legs 212, to operate simultaneously on opposite sides of the container 202.

In the embodiment shown, the actuation mechanism 218 is configured to bias the bail arm assembly 210 away from the roller assembly 252 such that the horizontal bar 215 is biased toward the distal wall 206 of the container 202, and the retraction mechanism 253 is configured to actively rotate the roller 254 in both the first direction D1 and the second direction D2. Additionally, the retraction mechanism 253 is further configured so as to apply a rotational force in the first direction D1 that is large enough to overcome the torque that is applied by the actuation mechanism 218 to bias the bail arm assembly 210. Accordingly, when the retraction mechanism 253 of the roller assembly 252 actively rotates the roller 254 in the first direction D1, the torque applied by the actuation mechanism 218 is overcome, the cover 250 is wound onto the roller 254, and the bail arm assembly 210 is rotated toward the roller assembly 252 as the bail arm end 209 of the cover 250 pulls the horizontal bar 215 toward the roller assembly 252. Conversely, when the retraction mechanism 253 of the roller assembly 252 actively rotates the roller 254 in the second direction D2, the actuation mechanism 218 biases the horizontal bar 215 away from the roller assembly 252, unwinding the cover 250 from the roller 254 as the horizontal bar 215 pulls the cover 250 toward the deployed position. In at least one alternative embodiment, however, the retraction mechanism 253 can be configured to actively rotate the roller 254 in only the first direction D1 and/or the actuation mechanism 218 can be configured to actively move the horizontal bar 215 of the bail arm assembly 210 toward and away from the deployed position.

Figure 2:
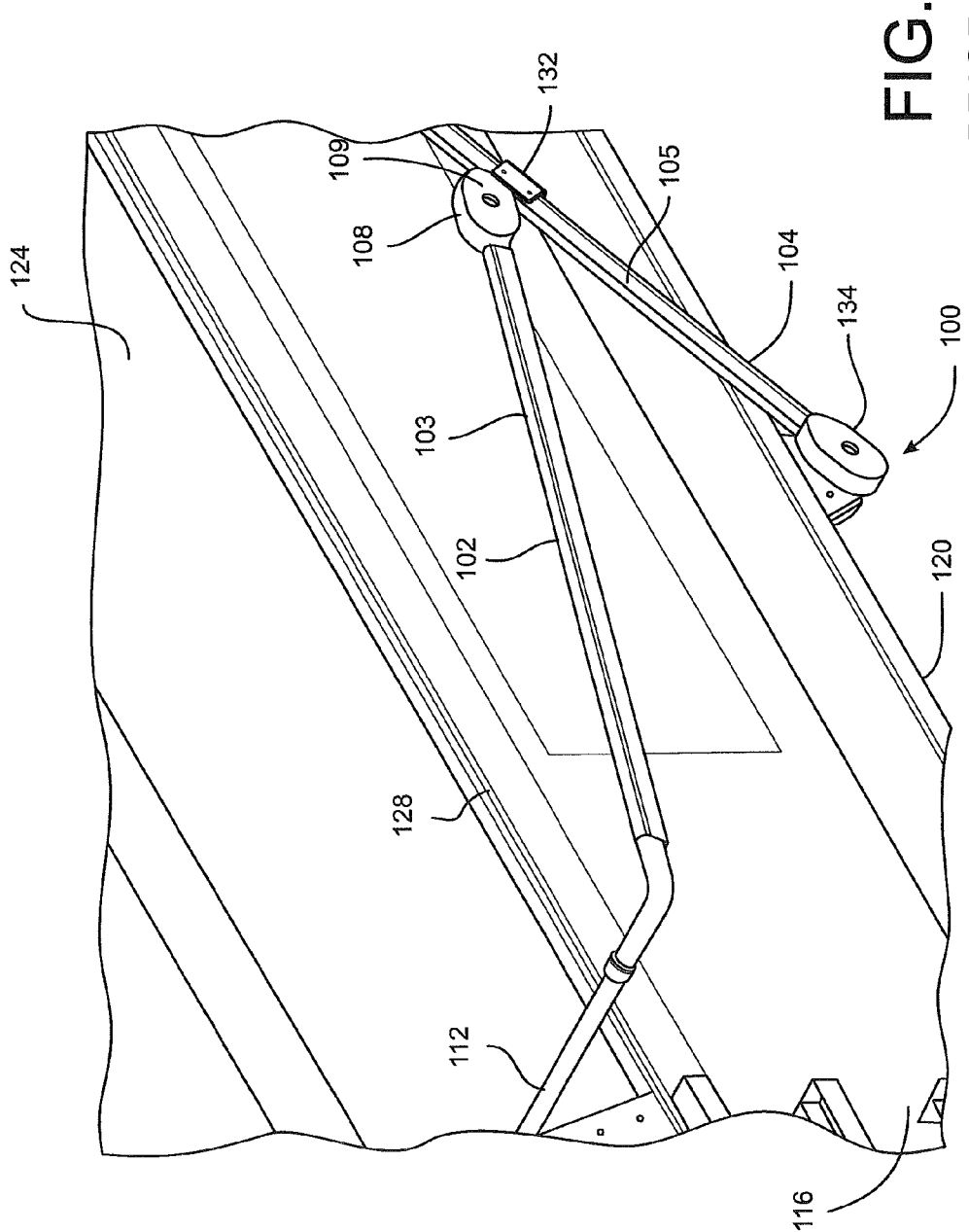
FIG. 2 is a perspective view of a prior tension bow mechanism for a flexible cover system disclosed in U.S. Pat. No. 8,267,461.

The cover system 200 further includes a tension bow assembly 220 and two elastic tension elements 230. The tension bow assembly 220 includes a pair of vertical legs 222 and a horizontal bar 228 coupled to both vertical legs 222. The vertical legs 222 are positioned on the outsides of the side walls 203, 204, and the horizontal bar 228 is situated on the outside of the cover 250, in the same manner as the horizontal section 112 of the mechanism shown in FIG. 2. The elastic tension elements 230 are connected to the horizontal bar 228 of the tension bow assembly 220 and to mounts 232 located on each of the side walls 203, 204 at the bottom wall 207 of the container 202. In one embodiment, the elastic tension elements 230 are elastic cables or cords, such as bungee cords. The elastic tension elements 230 can be connected to the horizontal bar 228 and to the mounts 232 in a conventional manner, such as by a brackets or collars. In at least one alternative embodiment, the cover system 200 includes only one elastic tension element 230 coupled to just one mount 232 located on one side of the container 202.

Each of the vertical legs 222 of the tension bow assembly 220 includes a pivot end 223 and horizontal bar end 229. The pivot end 223 of each vertical leg 222 is pivotably mounted to one of the vertical legs 212 of the bail arm assembly 210. In particular, each vertical leg 212 of the bail arm assembly 210 includes a bracket 226, and the pivot end 223 of each vertical leg 222 of the tension bow assembly 220 is mounted to a respective bracket 226 at a pivot engagement 224. The horizontal bar end 229 of each vertical leg 222 is mounted to the horizontal bar 228 adjacent to the elastic tension element 230.

Due to its elasticity, each elastic tension element 230 is configured to exert a force toward the center 231 of the elastic tension element 230 that is a function of the elasticity of the elastic tension element 230 and of the amount that the elastic tension element 230 is stretched. Because the mount 232 is fixed in position relative to the container 202 and the flexible cover system 200, the elastic tension element 230 exerts the force toward the mount 232. When the cover 250 is in the deployed position (shown in FIG. 5), the horizontal bar 228 is a first distance H1 away from the mount 232, stretching the elastic tension element 230 a first length L1 and exerting a first force F1 on the horizontal bar 232. As the cover 250 is moved to the partially deployed position (shown in FIG. 4), the horizontal bar 228 is a second distance H2 away from the mount 232, stretching the elastic tension element 230 a second length L2 and exerting a second force F2 on the horizontal bar 232. Finally, as the cover 250 is moved to the open position (shown in FIG. 3), the horizontal bar 228 is a third distance H3 away from the mount 232, stretching the elastic tension element 230 a third length L3 and exerting a third force F3 on the horizontal bar 232.

In the embodiment shown, the mounts 232 are positioned closer to the distal wall 206 of the container 202 than is the retraction mechanism 253 of the roller assembly 252. Additionally, the mounts 232 are positioned closer to the proximal wall 205 of the container 202 than are the pivot points 216 of the bail arm assembly 210. Accordingly, due to the position of the mounts 232 relative to the other components of the flexible cover system 200, the third length L3 is larger than the second length L2, which is larger than the first length L1. Thus, the third force F3 is larger than the second force F2, which is larger than the first force F1. In at least one alternative embodiment, the mounts 232 can be positioned in other locations resulting in different force distributions. Because a force is applied to the horizontal bar 228 at all positions of the flexible cover system 200, and because the horizontal bar 228 is positioned outside of the cover 250, the force generated by the elastic tension elements 230 and applied to the horizontal bar 228 holds the cover 250 down on the container 202 at a position between the distal wall 206 and the proximal wall 205 of the container 202.

Because, as mentioned above, the mounts 232 are situated nearer to the proximal wall 205 of the container 202 than are the pivot points 216 of the bail arm assembly 210, when the cover 250 is fully deployed over the top of the container (as shown in FIG. 5), first force F1 exerted by the elastic tension element 230 toward the mount 232 is directed in a downward direction that is nearly vertical. When the cover 250 is fully retracted from the top of the container 202 (as shown in FIG. 3), the third force F3 exerted by the elastic tension element 230 toward the mount 232 is directed at an angle of less than about 20°. Accordingly, through all positions of the cover 250 over the top of the container 202, the elastic tension element 230 exerts force through a narrow angular range, from nearly vertical in the deployed position to an angle of less than about 20° in the retracted or open position. As the direction of the force moves from nearly vertical to the angle of less than about 20°, the vertical component of the force decreases. This decrease offsets the increase in force caused by the stretching of the elastic tension member 230 to longer lengths so that the vertical downward force applied to the cover 250 does not change significantly between the undeployed and deployed positions.

In the embodiment shown, a separate elastic tension element 230 is provided outside each side wall 203, 204 of the container 202, each with its own mount 232. Alternatively, a single elastic tension element 230 may pass through each mount 232, across the outside of the bottom wall 207 of the container 202, to be connected to opposite ends of the horizontal bar 228. With this approach, any changes in elasticity of the elastic tension element 230 are experienced equally on both sides of the tension bow assembly 220.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A cover system for covering an open top of an open-topped container, comprising:
    a flexible cover having a first end and an opposite second end, the first end connected to the container, the flexible cover sized to substantially cover the open top when the second end of the flexible cover is moved to an extended position;
    a bail arm assembly having a first end and an opposite second end, the first end pivotally connected to the container and the second end connected to the second end of the flexible cover, the bail arm assembly configured to pivot from a stowed position to a deployed position in which the flexible cover is in the extended position;
    a tensioning bow assembly including a first end and an opposite second end, the first end pivotally connected to the bail arm assembly and the second end configured to bear against the flexible cover between the first and second ends of the flexible cover; and
    an elastic tension element connected between the container and the second end of the tensioning bow assembly, the elastic tension element configured and arranged to apply a force to the tensioning bow assembly to thereby apply a tension force against the flexible cover at the second end of the tensioning bow assembly.

2. The cover system of claim 1, wherein the tension force applied against the flexible cover includes a vertical component which remains substantially constant while the bail arm assembly is moved between the stowed position and the deployed position.

3. The cover system of claim 1, wherein the elastic tension element is coupled to the container at a location between the first end of the flexible cover and the first end of the bail arm assembly.

4. The cover system of claim 3, wherein the force applied to the tensioning bow assembly is applied at an angle relative to the location, the angle changing as the bail arm assembly is moved between the stowed position and the deployed position.

5. The cover system of claim 4, wherein the angle is approximately 0° when the bail arm assembly is in the deployed position.

6. The cover system of claim 4, wherein the angle is approximately 20° when the bail arm assembly is in the stowed position.

7. The cover system of claim 1, further comprising a roller assembly coupled to the container and having a roller coupled to the first end of the flexible cover, the roller assembly configured to wind the flexible cover onto and off of the roller.

8. The cover system of claim 7, wherein the bail arm assembly includes a spring configured to apply a torque to bias the second end of the bail arm assembly away from the roller assembly.

9. The cover system of claim 8, wherein:
    when the flexible cover is wound off of the roller of the roller assembly, the second end of the bail arm assembly is positioned away from the roller assembly and the flexible cover is in the extended position, and
    when the flexible cover is wound onto the roller of the roller assembly, the second end of the bail arm assembly is positioned adjacent to the roller assembly and the flexible cover is in the un-extended position.

10. The cover system of claim 7, wherein the tension force applied against the flexible cover includes a vertical component which remains substantially constant while the flexible cover wound onto and off of the roller.

11. The cover system of claim 7, wherein the elastic tension element is coupled to the container at a location between the roller of the roller assembly and the first end of the bail arm assembly.

12. The cover system of claim 11, wherein the force applied to the tensioning bow assembly is applied at an angle relative to the location, the angle changing as the flexible cover is wound onto and off of the roller.

13. The cover system of claim 12, wherein the angle is approximately 0° when the flexible cover is wound off of the roller.

14. The cover system of claim 12, wherein the angle is approximately 20° when the flexible cover is wound onto the roller.

* * * * *